(12) United States Patent
Okada

(10) Patent No.: US 7,276,687 B2
(45) Date of Patent: Oct. 2, 2007

(54) OPTICAL ENCODER AND ELECTRONIC EQUIPMENT USING THE SAME

(75) Inventor: Norikazu Okada, Kashihara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 113 days.

(21) Appl. No.: 11/206,739

(22) Filed: Aug. 19, 2005

(65) Prior Publication Data

US 2006/0038116 A1 Feb. 23, 2006

(30) Foreign Application Priority Data

Aug. 20, 2004 (JP) ............ P2004-240872
Jun. 30, 2005 (JP) ............ P2005-191699

(51) Int. Cl.
*G01D 5/34* (2006.01)
(52) U.S. Cl. ............ 250/231.13; 250/231.14
(58) Field of Classification Search ............ 250/231.13, 250/231.14, 231.16
See application file for complete search history.

(56) References Cited

U.S. PATENT DOCUMENTS 4,691,101 A * 9/1987 Leonard ............ 250/231.16

6,392,224 B1 * 5/2002 Holzapfel et al. ...... 250/231.13
2006/0266931 A1 * 11/2006 Shichi et al. ......... 250/214 R

FOREIGN PATENT DOCUMENTS

JP 2001-99684 A 4/2001

* cited by examiner

*Primary Examiner*—Thanh X. Luu
*Assistant Examiner*—Stephen Yam
(74) *Attorney, Agent, or Firm*—Birch, Stewart, Kolasch & Birch, LLP

(57) ABSTRACT

Given n move information signals and m slits 22 (n and m: positive integers), the number of photodiodes associated with the m slits 22 is set to $n \times m^a$ (a: a positive integer). By doing so, all of the ($n \times m^a$) photodiodes 23 can necessarily be positioned evenly in units of an equal number against the slits 22 and the move information signals. Also, the photodiodes can be subdivided more than in a conventional optical encoder having photodiodes counting a number represented by m×n, which is a common multiple of the number m of the slits 22 and the number n of move information signals. Thus, with light reception area of each photodiode reduced, shifts, distortions, variations and the like of the move information signals can be suppressed, resolution can be enhanced, and accurate move information signals can be obtained.

5 Claims, 5 Drawing Sheets

Fig. 2
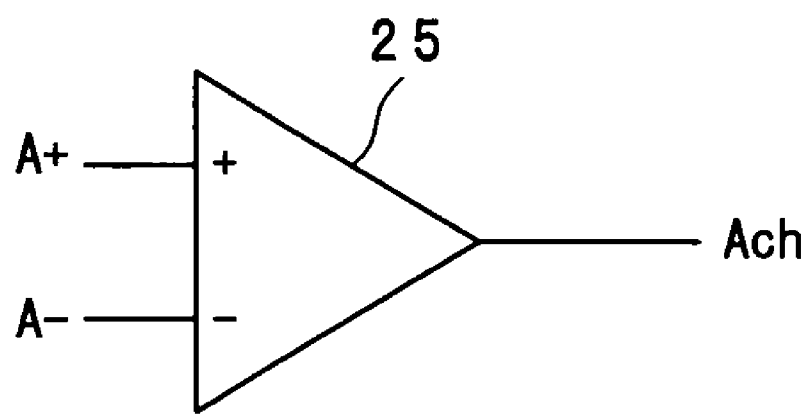
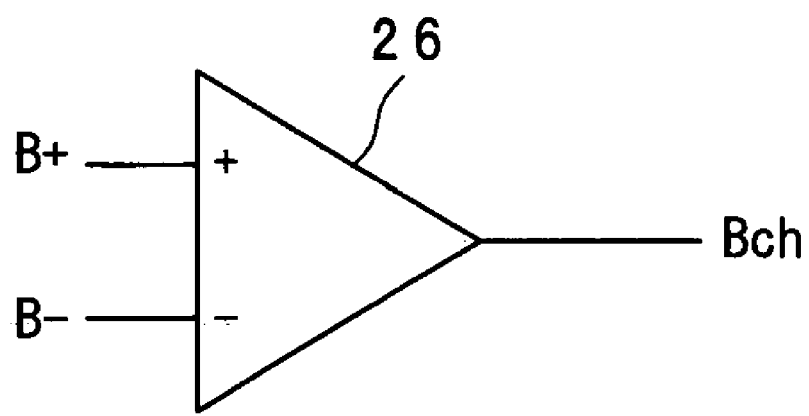

OPTICAL ENCODER AND ELECTRONIC EQUIPMENT USING THE SAME

This nonprovisional application claims priority under 35 U.S.C. §119(a) on Patent Application Nos. 2004-240872 and 2005-191699 filed in Japan on 20 Aug. 2004 and 30 Jun. 2005, respectively, the entire contents of which are hereby incorporated by reference.

BACKGROUND OF THE INVENTION

The present invention relates to an optical encoder for detecting position, moving speed, moving direction and the like of a mobile unit by using a light-emitting element and a light-receiving element. In particular, the invention relates to an optical encoder which is suitable for use in printing equipment such as copiers and printers as well as in electronic equipment such as FA (Factory Automation) equipment.

As an optical encoder of this type, there has been provided one having such a positional relation between a mobile unit and photodiodes as shown in FIG. 4 (see Patent Document 1 (JP 2001-99684 A)). This optical encoder has a plurality of sets of three slits 2a, 2b and 2c and four photodiodes 3a, 3b, 3c and 3d, wherein the four photodiodes 3a-3d are placed so as to sequentially face the three slits 2a-2c formed in the mobile unit 1, in order to read four optical modulation signals.

More specifically, the plurality of slits 2a, 2b and 2c are bored in the mobile unit 1 at an array pitch P. Further, the four photodiodes 3a-3d each having a width of (½)P are positioned at a pitch of (¾)P (an electrical angle of 270°). Thus, an interval of (¼)P is provided between the neighboring photodiodes 3a-3d. When the mobile unit 1 moves relative to a light-emitting part (not shown) and the photodiodes 3a-3d, the photodiodes 3a-3d receive light which is derived from the light-emitting part and which has passed through the slits 2a, 2b and 2c, and independent four optical modulation signals (i.e., move information signals) A+, B+, A−, B− are outputted from the four photodiodes 3a-3d.

In this case, for reading of move information of the mobile unit 1 by the optical encoder, light to be inputted onto the photodiodes 3a-3d from the light source of the light-emitting part ideally has a light quantity distribution evenly equal among light-receiving surfaces of the photodiodes 3a-3d. In such a case, it becomes possible to read only the move information associated with the mobile unit 1 accurately as an optical modulation signal.

However, there are involved, actually, dispersions of the light quantity distribution of the light source itself, dispersions of the light quantity distribution due to a focusing lens for the light source, the presence of diffracted light, refracted light and reflected light due to the mobile unit 1 or the like, variations in positional relations including the parallelism between the mobile unit 1 and the light-receiving surfaces of the individual photodiodes 3a-3d, size variations of the slits 2a-2c, variations due to contamination or the like of the light source, the mobile unit 1 and the photodiodes 3a-3d, variations in light reception sensitivity with respect to changes in the moving speed of the mobile unit 1, and so on. As a result of this, a plurality of move information signals acquired from the photodiodes 3a-3d have DC voltage offsets among signals, amplitude variations among signals, waveform distortions, phase variations among signals, and the like. This poses a problem that the acquired move information becomes inaccurate.

Thus, there has been proposed an optical encoder which has such a positional relation as shown in FIG. 5 between the mobile unit and the photodiodes in order to enhance the detection accuracy of the position, moving speed, moving direction and the like of the mobile unit 1 by Patent Document 1.

Hereinafter, each of the slits 2a-2c of FIG. 4 is generally designated as the slit 2 in some cases. Each of light-shielding parts 4a, 4b, 4c of the mobile unit 1 is generally designated as the light-shielding part 4 in some cases. Each of the photodiodes 3a-3d is generally designated as the photodiode 3 in some cases. Also, each of the slits 12a-12c of FIG. 5 is generally designated as the slit 12 in some cases. Each of light-shielding parts 14a, 14b, 14c of the mobile unit 11 is generally designated as the light-shielding part 14 in some cases. Each of the photodiodes 13a1, 13a2, 13a3, 13a4, 13b1, 13b2, 13b3, 13b4, 13c1, 13c2, 13c3, 13c4 is generally designated as the photodiode 13 in some cases.

This optical encoder includes a placement of k photodiodes 13 each of which results from equally dividing the photodiode 3 of Patent Document 1 by a number of x corresponding to k/n, which is a value resulting from dividing the common multiple k of m and n by n, where m (m is a natural number) is the number of slits 12 of a mobile unit 11, and n (n is a natural number) is the number of the move information signals. Then, output terminals of the photodiodes 13 are so connected every x terminals (x is a natural number) that the k photodiodes 13 output n independent move information signals.

For example, if m=3, n=4 and k=12, then the number x by which a widthwise length of the photodiode 3 i.e. a length of the photodiode 3 in the traveling direction of the mobile unit of Patent Document 1 is equally divided results in x=3. Thus, the light-receiving part composed of a plurality of photodiodes 13 is made up by arraying twelve photodiodes 13 each of which results from equally dividing the photodiode 3 of Patent Document 1 by three. Accordingly, the length of the mobile unit 11 on the light-receiving surface of the photodiode 13 in the traveling direction is one third of the length of the light-receiving surface of the photodiode 3 of Patent Document 1. In addition, output terminals of three photodiodes 13a1, 13b1, 13c1 are connected in common, and output terminals of three photodiodes 13a2, 13b2, 13c2 are connected in common. Also, output terminals of three photodiodes 13a3, 13b3, 13c3 are connected in common, and output terminals of three photodiodes 13a4, 13b4, 13c4 are connected in common. By these connections, the light-receiving part outputs the move information signals A+, B+, A−, B−, which are four independent high-accuracy optical modulation signals.

As shown above, with the optical encoder shown in FIG. 5, it becomes possible to reduce the light reception area of each photodiode 13 by subdividing each photodiode 3 as compared with the optical encoder of Patent Document 1. Therefore, shifts of move information signals obtained from the light-receiving part, waveform distortions, phase variations and the like can be suppressed, the resolution can be enhanced, and accurate move information can be obtained.

FIG. 6 shows a measurement result of photosensitivity with the use of the optical encoder shown in FIG. 5. According to FIG. 6, it can be understood that phase difference, amplitude and offset were improved over a measurement result of photosensitivity with the use of the optical encoder of Patent Document 1 shown in FIG. 7.

As shown above, with the optical encoder shown in FIG. 5, it becomes possible to improve the phase difference, amplitude and offset. However, the optical encoder shown in FIG. 5 has not completely eliminated the offset as can be seen from FIG. 6, nor having enough S/N (Signal-to-Noise) ratio. As a result of this, there is an issue that an optical encoder having even higher accuracy is necessary.

Further, with the use of a light source having larger dispersions of light quantity distribution for lower prices of the optical encoder, it is natural that larger dispersions on the light-receiving part side be involved. Due to this, when a small-size optical encoder is fabricated, enough lens condensation cannot be obtained, resulting in reception of light other than parallel light. Furthermore, when the slits 12 of the mobile unit 11 have a larger width, wraparound of light also becomes larger, making it impossible to obtain enough resolution. For this reason, a photodiode which is limitlessly strong to dispersions is needed.

SUMMARY OF THE INVENTION

Accordingly, an object of the present invention is to provide an optical encoder which is capable of obtaining accurate move information by suppressing shifts, waveform distortions, phase variations and the like of move information signals obtained from the light-receiving part.

In order to achieve the above object, the present invention provides an optical encoder comprising:

a mobile unit in which light-transmitting parts and light-shielding parts are alternately arrayed so as to be equal in width and equal in interval to one another, the light-transmitting parts being implemented by light-permeable parts or light-reflecting parts;

a light-emitting part for emitting light toward the mobile unit;

light-receiving parts for receiving light emitted from the light-emitting part via the light-transmitting parts of the mobile unit; and a move-information-signal generating part for, based on change quantities of the light which varies in response to motions of the mobile unit and which is received by the light-receiving parts, generating and outputting a plurality of move information signals which represent move information on the mobile unit and which are independent of one another, wherein the light-receiving parts are positioned in correspondence to a specified number of the light-transmitting parts and composed of a plurality of photodiodes provided to a number represented by a product of a number of move information signals and a power of a number of the corresponding light-transmitting parts.

With this constitution, the plurality of photodiodes positioned in correspondence to the specified number of light-transmitting parts to constitute the light-receiving parts are provided in a number represented by the product of the number of move information signals, which represent move information on the mobile unit with the light-transmitting parts provided thereon, and an exponential power of the number of the corresponding light-transmitting parts. Accordingly, the number of the plurality of photodiodes necessarily becomes divisible by the number of the move information signals, so that all of the photodiodes can be allocated evenly in units of an equal number against the individual move information signals. Further, since the number of the plurality of photodiodes is necessarily divisible by the number of the corresponding light-transmitting parts, all of the photodiodes can be allocated evenly in units of an equal number against the individual light-transmitting parts.

Moreover, the photodiodes constituting the light-receiving parts are subdivided more than in the optical encoder shown in FIG. 5 in which the photodiodes count a number represented by a common multiple of the number of the corresponding light-transmitting parts and the number of the move information signals. Also, the photodiodes can be allocated and arrayed more evenly against individual regions. Therefore, shifts, waveform distortions, phase variations and the like of the move information signals are suppressed, and the resolution are enhanced, so that accurate move information signals are obtained.

In one embodiment, each of sets is composed of a certain number of photodiodes, and the light-receiving parts are implemented by placement of a plurality of the sets of photodiodes.

According to the embodiment, since the specified number of move information signals are outputted from the plurality of sets of photodiodes, respectively, more accurate move information are obtained based on the plurality of sets of move information signals.

In one embodiment, the plurality of photodiodes constituting the light-receiving parts are arrayed such that an equal number of photodiodes are respectively assigned to regions each of which is composed of a light-transmitting part in the specified number of corresponding light-transmitting parts and a light-shielding part rearwardly neighboring the light-transmitting part in a moving direction of the mobile unit.

According to the embodiment, more accurate move information signals are obtained.

In one embodiment, assuming that an interval of the light-transmitting parts in the mobile unit is 1 pitch, with respect to mutually neighboring two photodiode groups each of which is composed of a plurality of photodiodes and are allocated to each of the regions, an interval between a photodiode of one photodiode group closest to the other photodiode group and a photodiode of the other photodiode group closest to the one photodiode group, and an interval between mutually neighboring two photodiodes belonging to an identical photodiode group, are each a value resulting from dividing the pitch by a product of the number of the move information signals independent of one another and a power of the number of the corresponding light-transmitting part.

According to the embodiment, the photodiode groups and the photodiodes belonging to one photodiode group are respectively evenly positioned with respective intervals inversely proportional to a power of the number of the corresponding light-transmitting parts. Therefore, the photodiodes constituting the light-receiving parts are allocated more evenly against the individual regions, so that more accurate move information signals are obtained.

In one embodiment, the number of the move information signals is four, the number of the light-transmitting parts corresponding to the light-receiving parts is three, the power is a square, the width of each photodiode is $(1/18) \times$ pitch, with respect to the mutually neighboring two photodiode groups, an interval between a photodiode of one photodiode group closest to the other photodiode group and a photodiode of the other photodiode group closest to the one photodiode group is $(1/12) \times$ pitch, and an interval between the mutually neighboring two photodiodes belonging to an identical photodiode group is $(1/36) \times$ pitch.

According to the embodiment, each of the light-receiving parts has 36 $(=4 \times 3^2)$ photodiodes for the four move information signals and the corresponding three light-transmitting parts, and the photodiode groups are positioned with intervals of (1/12)×pitch while the photodiodes belonging to an identical photodiode group are positioned with intervals of (1/36)×pitch. Therefore, the 36 photodiodes can be arrayed and allocated in well-balanced units of 12 pcs. against the individual regions, respectively, each of which is composed of one light-transmitting part in the corresponding three light-transmitting parts and one light-shielding part rearwardly neighboring the light-transmitting part in the moving direction of the mobile unit.

In one embodiment, the number of the move information signals is four, the number of the light-transmitting parts corresponding to the light-receiving parts is three, the power is a cube, the width of the or each photodiode is (1/54)×pitch, with respect to the mutually neighboring two photodiode groups, an interval between a photodiode of one photodiode group closest to the other photodiode group and a photodiode of the other photodiode group closest to the one photodiode group is (1/36)×pitch, and an interval between the mutually neighboring two photodiodes belonging to an identical photodiode group is (1/108)×pitch.

According to the embodiment, each of the light-receiving parts has 108 (=4×3³) photodiodes for the four move information signals and the corresponding three light-transmitting parts, and the photodiode groups are positioned with intervals of (1/36)×pitch while the photodiodes belonging to an identical photodiode group are positioned with intervals of (1/108)×pitch. Therefore, the 108 photodiodes are arrayed and allocated in well-balanced units of 36 pcs. against the individual regions, respectively, each of which is composed of one light-transmitting part in the corresponding three light-transmitting parts and one light-shielding part rearwardly neighboring the light-transmitting part in the moving direction of the mobile unit.

Further, further subdivision of the photodiodes is implemented as compared with the case where the power is a square. Accordingly, all the photodiodes are allocated more evenly to the move information signals and the light-transmitting parts, than in the case where the power is a square. Therefore, shifts, waveform distortions, phase variations and the like of the move information signals are suppressed, and the resolution is enhanced, so that more accurate move information signals are obtained.

In one embodiment, assuming that a interval of the light-transmitting parts in the mobile unit is 1 pitch and that a direction toward which the mobile unit advances is a forward side, and assuming that with respect to a plurality of photodiodes belonging to photodiode groups each of which is composed of a plurality of photodiodes and are allocated to each of the regions, photodiodes positioned at odd-numbered places as counted from a forward top are first photodiodes while photodiodes positioned at even-numbered places are second photodiodes, and further that out of the first photodiodes, photodiodes arrayed at forward-side (½)×pitch are first A photodiodes while photodiodes arrayed at rearward-side (½)×pitch, opposite to the forward side, are assigned as first B photodiodes, and moreover out of the second photodiodes, photodiodes arrayed at foremost-side (¼)×pitch and rearmost-side (¼)×pitch are second A photodiodes while photodiodes arrayed at a middle (½)×pitch between foremost-side (¼)×pitch and rearmost-side (¼)×pitch are second B photodiodes, then the move-information-signal generating part generates and outputs four move information signals independent of one another and representing move information on the mobile unit based on signals representing change quantities of received light quantity derived from four types of photodiodes, the first A photodiodes, the first B photodiodes, the second A photodiodes and the second B photodiodes.

According to the embodiment, four move information signals independent of one another can be generated by, in each of the photodiode groups, adding up outputs derived from all the first A photodiodes positioned at odd-numbered places, as counted from the forward top, and arrayed at forward-side (½)×pitch, adding up outputs derived from all the first B photodiodes positioned at odd-numbered places, as counted from the forward top, and arrayed at rearward-side (½)×pitch, adding up outputs derived from all the second A photodiodes positioned at even-numbered places, as counted from the forward top, and arrayed at foremost-side (¼)×pitch and rearmost-side (¼)×pitch, and adding up outputs derived from all the second B photodiodes positioned at even-numbered places, as counted from the forward top, and arrayed at a middle (½)×pitch between foremost-side (¼)×pitch and rearmost-side (¼)×pitch.

Electronic equipment of one embodiment includes the optical encoder as defined in the above.

According to the constitution, move information signals accurately representing move information on the mobile unit provided at a moving place are obtained.

As apparent from the above description, in the optical encoder of the present invention, since the plurality of photodiodes which are positioned in correspondence to the specified number of light-transmitting parts provided on a mobile unit and which constitute the light-receiving parts are provided to the number represented by a product of the number of move information signals, which represent move information on the mobile unit, and a power of the number of the corresponding light-transmitting parts, the number of the plurality of photodiodes is necessarily divisible by the number of the move information signals and the number of the corresponding light-transmitting parts. Therefore, all the photodiodes can be arrayed and allocated evenly in units of an equal number to the individual regions which are composed of one light-transmitting part in the specified number of corresponding light-transmitting parts and one light-shielding part rearwardly neighboring the light-transmitting part in the moving direction of the mobile unit. Besides, the photodiodes can be allocated evenly in units of an equal number also to the move information signals.

Further, the photodiodes constituting the light-receiving parts are subdivided further than in the case of the optical encoder shown in FIG. 5 which has photodiodes counting a number represented by a common multiple of the number of the corresponding light-transmitting parts and the number of the move information signals, so that the photodiodes can be allocated and arrayed more evenly against the individual regions. Besides, with the light reception area of each photodiode reduced, shifts, waveform distortions, phase variations and the like of the move information signals can be suppressed, and the resolution can be enhanced, so that accurate move information signals can be obtained.

Furthermore, the electronic equipment of the present invention, which includes the optical encoder described above, is enabled to obtain move information signals accurately representing move information on the mobile unit provided at a moving place.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIG. 2 is a block diagram of a light-receiving side of the light-receiving side circuit in the optical encoder shown in FIG. 1;

DETAILED DESCRIPTION OF THE INVENTION

Figure 1:
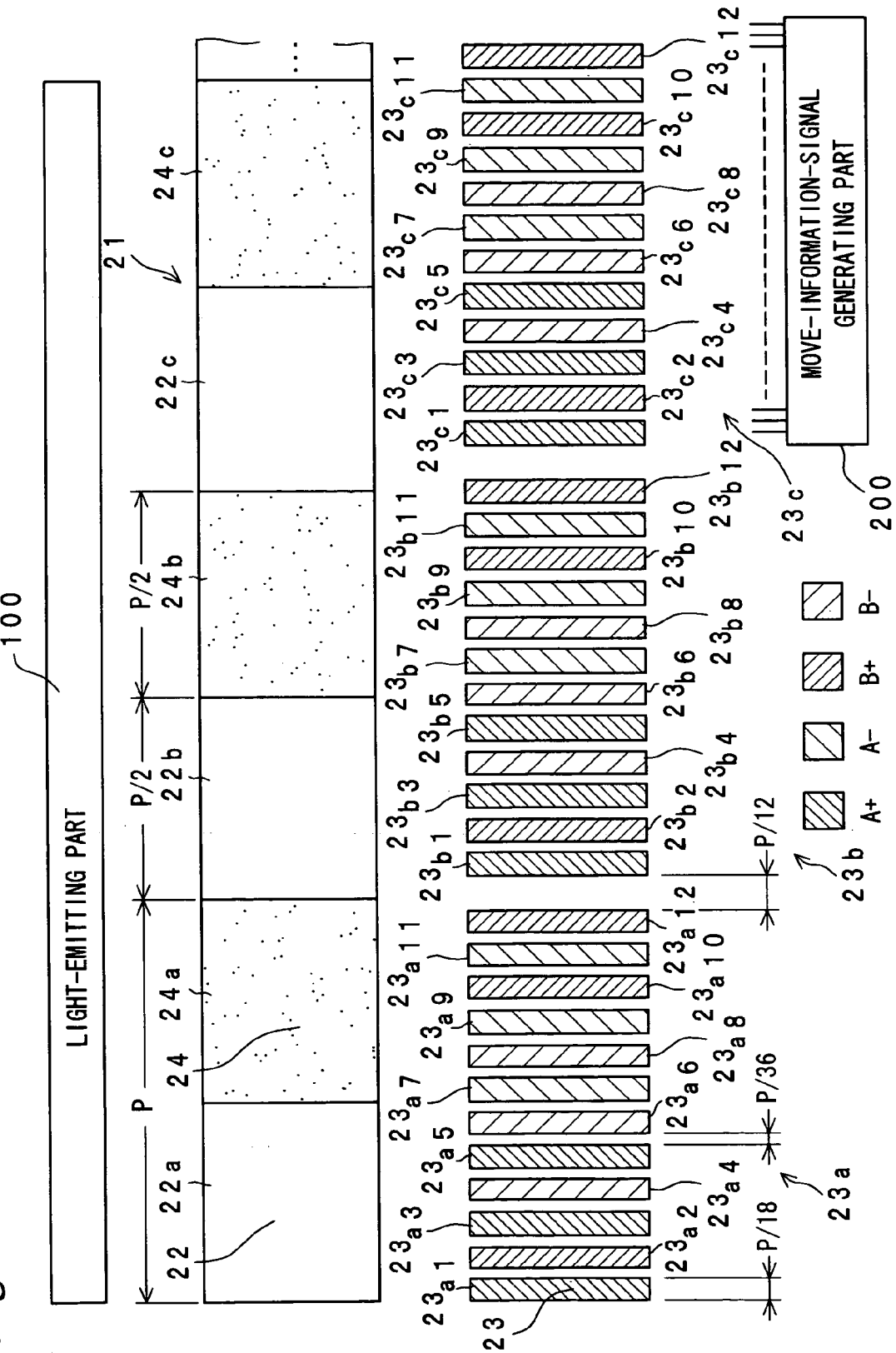
FIG. 1 is a view showing a positional relation between a mobile unit and photodiodes in an optical encoder of the present invention.

Hereinbelow, the present invention is described in detail by embodiments thereof illustrated in the accompanying drawings. FIG. 1 is a view showing a positional relation between a mobile unit and photodiodes in an optical encoder of this embodiment.

This optical encoder includes a mobile unit 21 in which slits 22a, 22b and 22c serving as examples of light-transmitting parts and light-shielding parts 24a, 24b and 24c are alternately arrayed so as to be equal in width and equal in interval to one another, a light-emitting part 100 for emitting light toward the mobile unit 21, photodiodes 23a1, 23a2, 23a3, ... 23a12, 23b1, 23b2, 23b3, ... 23b12, 23c1, 23c2, 23c3, ... 23c12 serving as examples of light-receiving parts for receiving light emitted from the light-emitting part 100 via the slits 22a, 22b and 22c of the mobile unit 21, and a move-information-signal generating part 200 for generating and outputting a plurality of move information signals which represent move information on the mobile unit 21 and which are independent of one another, based on change quantities of the light which varies in response to motions of the mobile unit 21 and which is received by the photodiodes 23a1, 23a2, 23a3, ... 23a12, 23b1, 23b2, 23b3, ... 23b12, 23c1, 23c2, 23c3, ... 23c12.

Hereinbelow, each of the slits 22a, 22b, 22c is generally designated as the slit 22 in some cases. Each of the light-shielding parts 24a, 24b, 24c is generally designated as the light-shielding part 24 in some cases. Each of the photodiodes 23a1, 23a2, 23a3, ... 23a12, 23b1, 23b2, 23b3, ... 23b12, 23c1, 23c2, 23c3, ... 23c12 is generally designated as the photodiode 23 in some cases.

Figure 4:
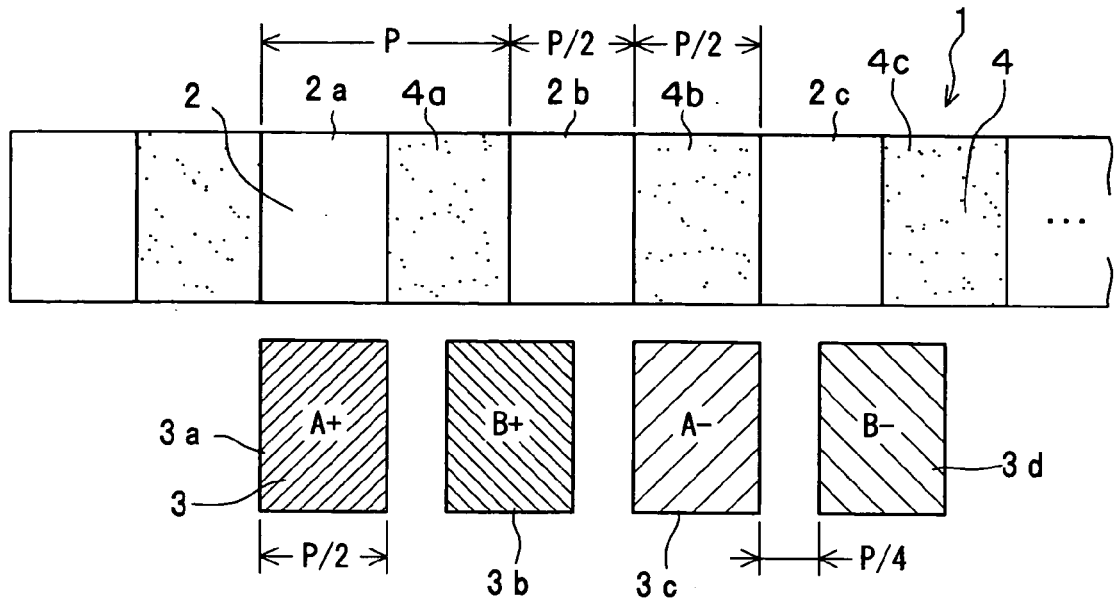
FIG. 4 is a view showing a positional relation between a mobile unit and photodiodes in an optical encoder of the background art.
Figure 5:
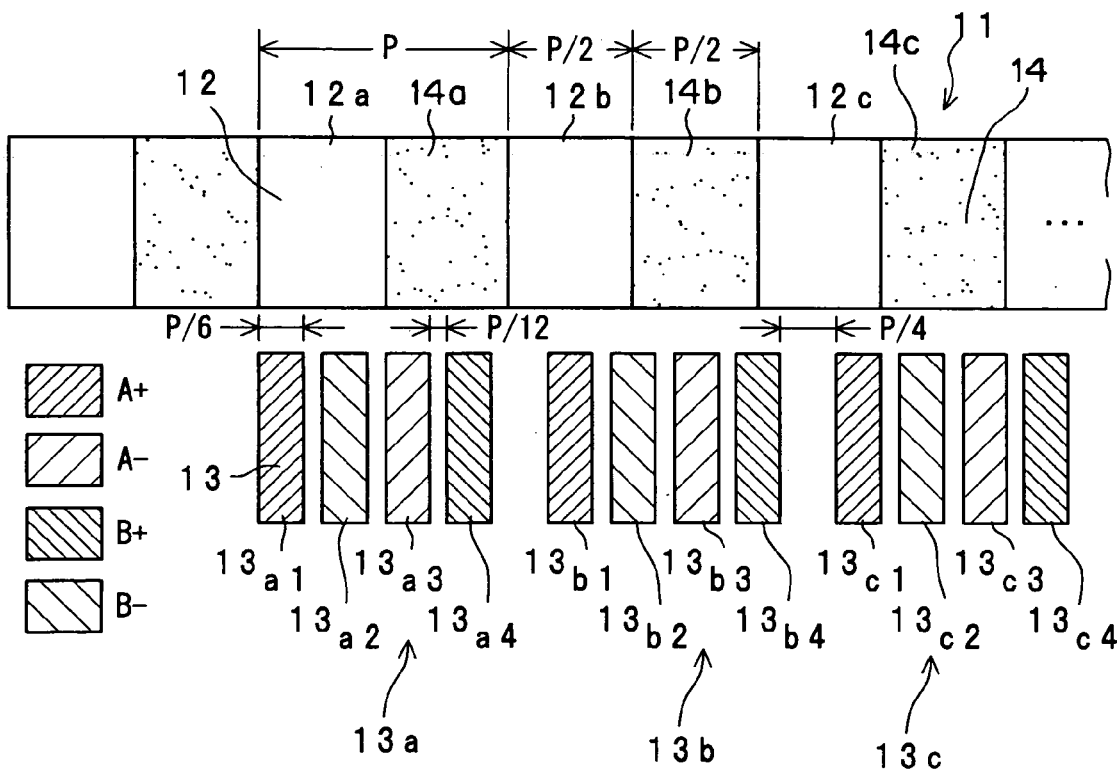
FIG. 5 is a view showing a positional relation between a mobile unit and photodiodes in an optical encoder of the background art other than that of FIG. 4.
Figure 6:
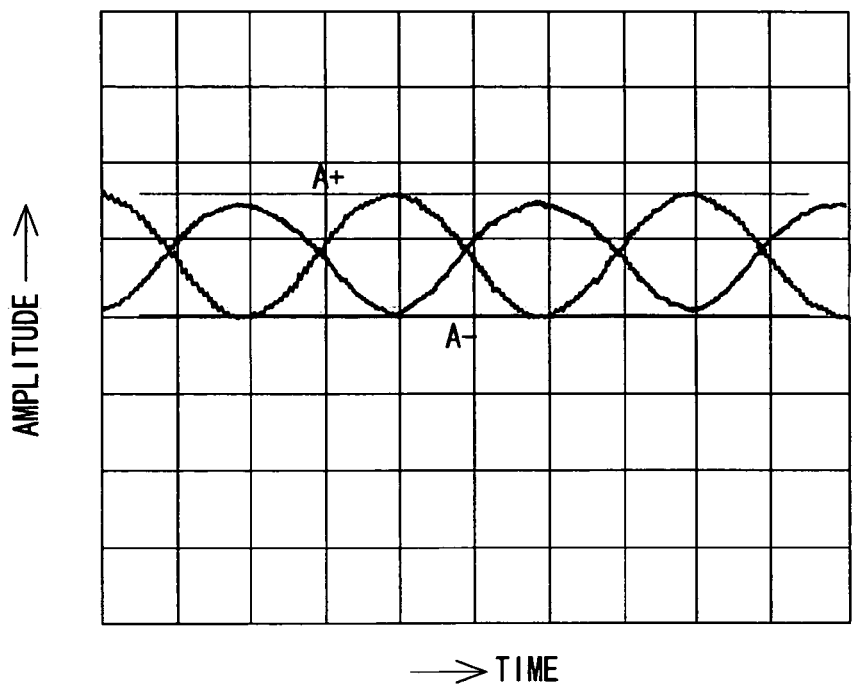
FIG. 6 is a view showing photosensitivity with the use of the optical encoder shown in FIG. 5.
Figure 7:
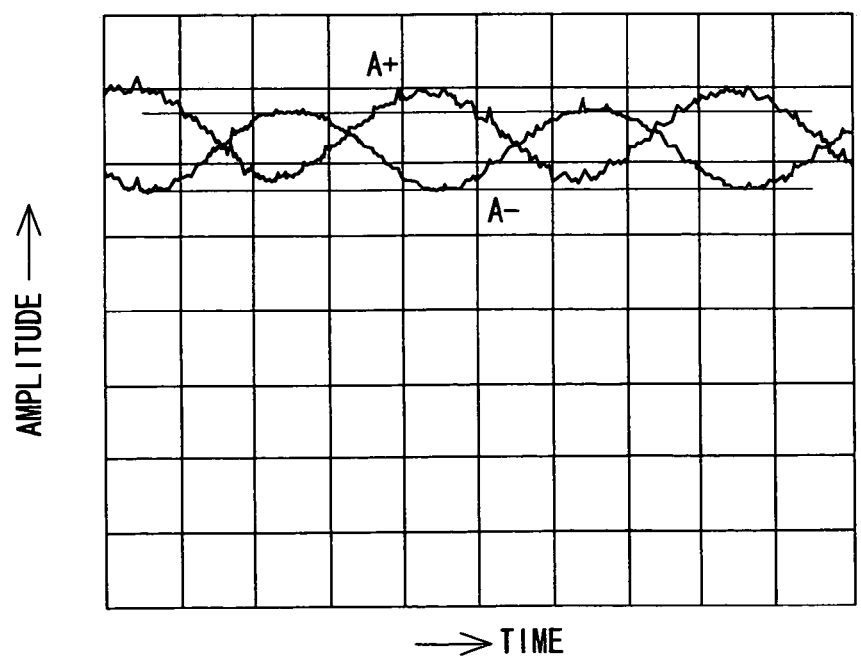
FIG. 7 is a view showing photosensitivity with the use of the optical encoder shown in FIG. 4.

Meanwhile, as in the case of the optical encoder of the background art shown in FIG. 5, encoder characteristics can be improved by subdividing the photodiodes 3 of Patent Document 1 of FIG. 4 by a common multiple of the number of move information signals and the number of slits 12 as the light transmission parts. Further, in the case where the subdivided photodiodes 13 are placed, various dispersions can be reduced by setting equal intervals of three groups 13a, 13b and 13c of photodiodes 13a1, 13a2, 13a3, 13a4; 13b1, 13b2, 13b3, 13b4; and 13c1, 13c2, 13c3, 13c4 associated with the slits 12a-12c, respectively, as well as by setting equal intervals of the individual photodiodes 13a1, 13a2, 13a3, 13a4; 13b1, 13b2, 13b3, 13b4; and 13c1, 13c2, 13c3, 13c4 belonging to each same photodiode group 13a, 13b and 13c.

In this connection, it is proper to subdivide the individual photodiodes 3 of Patent Document 1 into a number raised to an exponential power of the number of slits 22 provided in the mobile unit 21 as shown in FIG. 1. For instance, if the number of move information signals is four represented by A+, B+, A−, B−, and if the number of the slits 22 is '3', then the number of photodiodes 23 associated with the three slits 22 is set to $$4 \times 3^2 = 36 \text{ (pcs.)}, \ 4 \times 3^3 = 108 \text{ (pcs.)}, \ 4 \times 3^4 = 324 \text{ (pcs.)},$$

The reason of this is that since the number of slits 22 confronting the photodiodes 23 is constantly fixed at '3', the photodiodes 23, if their number is one divisible by the number '3', can necessarily be evenly allocated by an equal number for each of the slits 22.

Further, with the total number of the photodiodes 23 set to a multiple of the number of move information signals A+, B+, A−, B− as described above, the number of the photodiodes 23 is divisible by the number '4' of the move information signals A+, B+, A−, B− so that the photodiodes 23 can necessarily be allocated to each move information signal A+, B+, A−, B− by an equal number.

Furthermore, for the subdivision of photodiodes, it is necessary that the number of slits 22 and the number of move information signals A+, B+, A−, B− do not have any common denominator. The reason of this is that, for example, if the number of slits 22 is '2' and the number of move information signals is '4', i.e., if those numbers have a common factor '2', then the number '4' of move information signals can be divided by the number '2' of slits 22. Therefore, the photodiodes, even if subdivided, do not need to be re-arrayed for association with the 'two' slits 22, or more straightforwardly, can be positioned at the same locations as those before the subdivision, so that the intervals between the subdivided photodiodes cannot be reduced. In contrast to this, for example, if the number of slits 22 is '2' and the number of move information signals is '3', i.e., if those numbers are mutually different prime numbers, then the number '3' of the move information signals cannot be divided by the number '2' of the slits 22. Thus, for subdivision into a total of six photodiodes by two-dividing three photodiodes equally corresponding to the number '3' of move information signals, it is necessary to re-array the photodiodes into two groups each counting 3 pcs. of photodiodes so that '6' photodiodes are associated with '2' slits 22. Accordingly, in doing the re-array, the intervals between the subdivided photodiodes can be reduced.

By the arrangement that a plurality of sets of the photodiodes 23 resulting from the subdivision described above of the photodiodes of Patent Document 1 are arranged in columns and rows, there can be obtained an effect that additions are enabled when the light-reception sensitivity is small, and the additions are effective for larger light quantity dispersions and the like as well.

For the placement of the subdivided photodiodes 23, equal placement is enabled by allocating an equal number of photodiodes 23 to each of the plurality of slits 22. For example, referring to FIG. 1, three photodiodes 23 for the move information signals A+, B+, A−, B−, i.e., a total of twelve photodiodes 23 are allocated to one pitch P composed of one slit 22 and one light-shielding part 24. That is, three sets of photodiodes 23, one set being composed of twelve photodiodes 23, are positioned in association with three slits 22a, 22b, 22c. It is noted that the number of photodiodes 23 for one identical move information signal in the one set of photodiodes 23 needs to be set according to dispersion conditions of light quantity and the like.

Further, the same move information signals A+, B+, A−, B− as the move information signals A+, B+, A−, B− of Patent Document 1 of FIG. 4 before the subdivision can be obtained from an addition of output signals of the photodiodes 23 of the photodiode groups 23a, 23b, 23c on condition that each of the photodiode groups 23a, 23b, 23c includes a plurality of subdivided photodiodes 23 having the same position relations as those of the photodiodes 3a, 3b, 3c of FIG. 4 with respect to one slit 22 and one light-shielding part i.e., light-nontransmitting region 24. For instance, the same move information signal 'B−' as in Patent Document 1 (see FIG. 4) can be obtained by adding up output signals of photodiodes 23a4, 23a6, 23a8 which are placed at positions confronting part of the slit 22a and part of the light-nontransmitting region 24a in FIG. 1, like the positions confronting part of the slit 2c and part of the light-nontransmitting region 4c confronting the photodiode 3d for the move information signal B− in Patent Document 1.

Now, with regard to the 'three' slits 22a-22c confronting the plurality of photodiodes 23a1-23c12 of which the light-receiving part is composed, the photodiode group is given by the plurality of photodiodes 23a1-23a12 which are allocated and arrayed to a region composed of one slit 22a and one light-nontransmitting region 24a rearwardly neighboring the slit 22a in the moving direction of the mobile unit 21. Then, as to the intervals of the photodiode groups 23a, 23b, 23c, a placement with equal intervals can be fulfilled by the photodiodes 23 subdivided by a number raised to a power of the number of confronting optical slits 22. It is noted here that the interval of the photodiode group 23a, 23ba, 23c is defined as follows. For example, the interval of mutually neighboring two photodiode groups 23a and 23b is an interval between a photodiode 23a12 of one photodiode group 23a closest to the other photodiode group 23b and a photodiode 23b1 of the other photodiode group 23b closest to the one photodiode group 23a. Then, for example, on the assumption that the array interval of the slits 2 is 1 P (Pitch), whereas the photodiode interval of the optical encoder of Patent Document 1 shown in FIG. 4 is (¼)P and the interval of the photodiode group 13a, 13b, 13c of the conventional optical encoder shown in FIG. 5 is (¼)P, the interval of the photodiodes 23 and the interval of the photodiode groups 23a, 23b, 23c of the optical encoder shown in FIG. 1 are P/36 and P/12 represented by 1/(4× power of 3)P respectively.

Conventionally, the photodiodes and the succeeding-stage circuits are constructed as follows. That is, in the case of the optical encoder of Patent Document 1 shown in FIG. 4, with respect to the move information signals A+, B+, A−, B− outputted from the four photodiodes 3a-3d, the move information signal A+ and the move information signal A− are compared with each other and amplified by an amplifier 25 as shown in FIG. 2, while the move information signal B+ and the move information signal B− are compared with each other and amplified by an amplifier 26. Thus, an Ach signal and a Bch signal which are different in phase by 90° from each other are extracted.

Also in this embodiment, in which the subdivided photodiodes 23 are used, the photodiodes 23 and the move-information-signal generating circuit i.e., the succeeding-stage circuit 200 are constructed basically similarly to the background art. That is, photodiodes 23 that output Ach move information signals whose period corresponds to the array pitch P of the slits 22, and photodiodes 23 that output Bch move information signals whose phase is lagged by 90° to the Ach move information signals, are alternately positioned.

Then, assuming that the direction toward which the mobile unit 21 advances is the forward side, out of the Ach-dedicated photodiodes 23 positioned at odd-numbered places as counted from the forward top, photodiodes 23a1, 23a3, 23a5 arrayed at forward-side (½)P are assigned as photodiodes for the move information signal A+, while photodiodes 23a7, 23a9, 23a11 arrayed at rearward-side (½)P are assigned as photodiodes for the move information signal A−. Also, out of the Bch-dedicated photodiodes 23 positioned at even-numbered places as counted from the forward top, photodiodes 23a2, 23a10, 23a12 arrayed at foremost-side (¼)P and rearmost-side (¼)P are assigned as photodiodes for the move information signal B+, photodiodes 23a4, 23a6, 23a8 arrayed at a middle (½)P between foremost-side (¼)P and rearmost-side (¼)P are assigned as photodiodes for the move information signal B−.

Then, outputs of the photodiodes 23a1, 23a3, 23a5 for the move information signal A+ are added up and inputted to a '+' terminal of the amplifier 25 shown in FIG. 2. Meanwhile, outputs of the photodiodes 23a7, 23a9, 23a11 for the move information signal A− are added up and inputted to a '−' terminal of the amplifier 25. Similarly, outputs of the photodiodes 23a2, 23a10, 23a12 for the move information signal B+ are added up and inputted to a '+' terminal of the amplifier 26 shown in FIG. 2. Meanwhile, outputs of the photodiodes 23a4, 23a6, 23a8 for the move information signal B− are added up and inputted to a '−' terminal of the amplifier 26. The amplifiers 25 and 26 are included in the move-information-signal generating circuit 200.

Thus, an Ach signal and a Bch signal which are different in phase by 90° from each other are outputted from the amplifier 25 and the amplifier 26, respectively. In this case, the move information signals A+, B+, A−, B− are obtained by adding up signals derived from a subdivided plurality (three in FIG. 1) of photodiodes 23. Therefore, output signals having less variations of phase shifts can be obtained.

A concrete example is explained on the case shown in FIG. 1. Referring to FIG. 1, as described above, four sets of photodiodes 23, which result from subdividing each of the four photodiodes 3, 3, 3 and 3 of Patent Document 1 into '9', which is the square of the number '3' of slits 22, are placed. That is, photodiodes 23 counting '36', which is represented by a product of the number '4' of move information signals and the square of the number '3' of slits 22, are placed. Then, the way of placement in this case is given by the conditions that the width of each photodiode 23 is (⅟18)×P, the interval of the photodiodes 23 is (⅟36)×P, and the interval of the photodiode groups 23a, 23b, 23c is (⅟12)×P. Also, with regard to the move information signals, three photodiode groups 23a, 23b and 23c each composed of twelve photodiodes 23 having an order of A+, B+, A+, B−, A+, B−, A−, B−, A−, B+, A−, B+ are arrayed. Then, signals of identical channels and identical signs are added up, and comparison operations are performed by the amplifier 25 and the amplifier 26 as shown in FIG. 2. Thus, an optical encoder which has consistency and enough S/N (Signal-to-Noise) ratio can be obtained.

Figure 3:
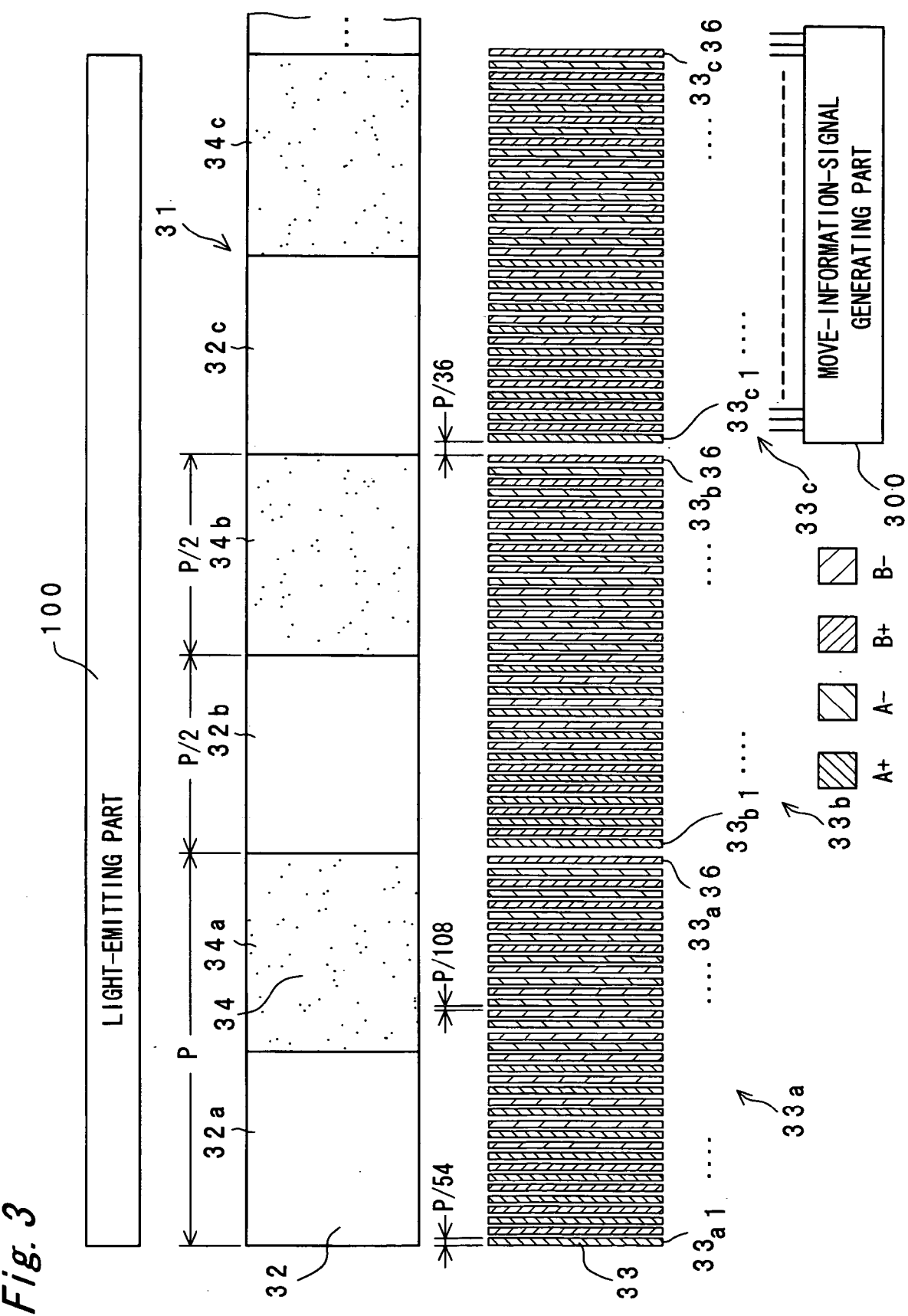
FIG. 3 is a view showing a positional relation between a mobile unit and photodiodes in an optical encoder other than that of FIG. 1.

Further, in the case that it is practicable to fabricate even thinner photodiodes by semiconductor processes, it becomes possible to use photodiodes obtained by further subdividing the photodiode 3 of Patent Document 1 as shown in FIG. 3.

The optical encoder of FIG. 3 includes a mobile unit 31 in which slits 32a, 32b and 32c serving as examples of light-transmitting parts and light-shielding parts 34a, 34b and 34c are alternately arrayed so as to be equal in width and equal in interval to one another, a light-emitting part 100 for emitting light toward the mobile unit 31, photodiodes 33a1, 33a2, 33a3, . . . 33a36, 33b1, 33b2, 33b3, . . . 33b36, 33c1, 33c2, 33c3, . . . 33c36 serving as examples of light-receiving parts for receiving light emitted from the light-emitting part 100 via the slits 32a, 32b and 32c of the mobile unit 31, and a move-information-signal generating part 300 for generating and outputting a plurality of move information signals which represent move information on the mobile unit 31 and which are independent of one another, based on change quantities of the light which varies in response to motions of the mobile unit 31 and which is received by the photodiodes 33a1, 33a2, 33a3, . . . 33a36, 33b1, 33b2, 33b3, . . . 33b36, 33c1, 33c2, 33c3, . . . 33c36.

Hereinbelow, each of the slits 32a, 32b, 32c is generally designated as the slit 32 in some cases. Each of the light-shielding parts 34a, 34b, 34c is generally designated as the light-shielding part 34 in some cases. Each of the photodiodes 33a1, 33a2, 33a3, . . . 33a36, 33b1, 33b2, 33b3, . . . 33b36, 33c1, 33c2, 33c3, . . . 33c36 is generally designated as the photodiode 33 in some cases.

Referring to FIG. 3, four sets of photodiodes 33 obtained by subdividing each of the four photodiodes 3 of Patent Document 1 into a number of '27', which is the cube of the number '3' of slits 32, are placed. That is, photodiodes 23 counting '108', which is represented by a product of the number '4' of move information signals and the cube of the number '3' of slits 32, are placed. Then, the way of placement in this case is given by the conditions that the width of each photodiode 33 is (1/54)×P, the interval of the photodiodes 33 is (1/108)×P, and the interval of the photodiode groups 33a, 33b, 33c is (1/36)×P. Also, with regard to the move information signals, three photodiode groups 33a, 33b, 33c each composed of thirty-six photodiodes 33 having an order of A+, B+, A+, B+, A+, B+, A+, B+, A+, B−, A+, B−, A+, B−, A+, B−, A+, B−, A−, B−, A−, B−, A−, B−, A−, B−, A−, B+, A−, B+, A−, B+, A−, B+, A−, B+ are arrayed. Then, signals of identical channels and identical signs are added up, and comparison operations are performed by the amplifier 25 and the amplifier 26 as shown in FIG. 2. Thus, an optical encoder which has consistency and enough S/N ratio can be obtained. In addition, the amplifiers 25 and 26 are included in the move-information-signal generating circuit 300. As shown above, in this embodiment, the photodiodes 23 or 33 obtained by subdividing the photodiodes 3 of Patent Document 1 into a number represented by a power of the number of slits 22 or 32 confronting the light-receiving part i.e., photodiodes 23 or 33 are placed by a number represented by a product of the number of move information signals A+, B+, A−, B− and a power of the number of slits 22 or 32. Since the distance between neighboring photodiodes 23 or 33 is shortened by the subdivision of photodiodes 3 of FIG. 4, it becomes possible to achieve a well-balanced placement of photodiodes 23 or 33 against the individual regions, which are composed of the slits 22 or 32 and the light-shielding parts i.e, light-nontransmitting regions 24 or 34, as well as against the individual move information signals A+, B+, A−, B−.

Also, the number of photodiodes 23 or 33 is divisible by the number of the move information signals A+, B+, A−, B− and the number of slits 22 or 32. Therefore, all the photodiodes 23 or 33 can be allocated and positioned evenly in equal numbers for the move information signals A+, B+, A−, B− and the slits 22 or 32, respectively.

Furthermore, the interval of the photodiode groups allocated to the individual regions composed of the slits 22 or 32 and the light-nontransmitting regions 24 or 34, as well as the interval of the photodiodes 23 or 33 belonging to an identical photodiode group are set to values resulting from dividing the array pitch P of the slits 22 or 32 by a product of the number of move information signals A+, B+, A−, B− and an exponential power of the number of slits 22 or 32. Therefore, the photodiode groups and the photodiodes 23 or 33 belonging to one photodiode group can be uniformly positioned with intervals inversely proportional to the number of slits 22, 32.

As apparent from the above description, the placement of the photodiodes 23 or 33, the intervals of the photodiode groups and the photodiodes 23 or 33, and the placement of the photodiodes 23 or 33 for the individual move information signals A+, B+, A−, B− can be made all uniform. Therefore, shifts, waveform distortions, phase variations and the like of the move information signals A+, B+, A−, B− can be suppressed, and the resolution can be enhanced, so that accurate move information signals A+, B+, A−, B− can be obtained.

The optical encoders described in the foregoing embodiments are suitable for use as optical sensors of printing equipment and FA (Factory Automation) equipment.

In the above embodiments, the array direction of the slits 22 or 32 is not particularly limited. For example, slits may be arrayed in a circular-arc shape around a mobile unit having a circular-disc shape, or may be arrayed in a linear shape on a mobile unit having a straight board shape.

The above embodiments show, as an example, a permeable type in which light derived from a light-emitting part 100 placed on one side of the mobile unit 21 or 31 is transmitted by the slits 22 or 32, which are light permeable parts, so as to be incident on the photodiodes 23 or 33 placed on the other side of the mobile unit 21 or 31. However, the present invention is not limited to this but applicable also to a reflection type (not shown) in which light derived from a light-emitting part placed on one side of a mobile unit is reflected by light-nontransmitting regions so as to be incident on photodiodes placed on the other side of the mobile unit. In this case, the slits function as the light-shielding part.

Further, the present invention is also applicable to a reflection type in which the light-transmitting parts are implemented by light-reflecting members in place of the slits 22, 32, light derived from a light-emitting part placed on one side of a mobile unit is reflected by the light-reflecting members so as to be incident on photodiodes placed on the one side of the mobile unit. In this case, needless to say, a spacing between the light-reflecting members in the mobile unit functions as the light-shielding member. Also in this case, for example, nickel plating is used as the light-reflecting members, and copper which is oxidized so as to be blackened and further the surface of which is roughened is used as the light-shielding member. As a manufacturing method therefor, copper is coated with nickel plating, and the nickel plating of specified regions is removed by etching, by which the light-reflecting member regions and the light-shielding member regions are formed.

Furthermore, regardless of the permeable type or the reflection type, the mobile unit may be a light-shielding board in which through holes serving as the slits are provided, or a transparent board in which a light-shielding film serving as a light-shielding member is provided and its portions serving as the slits are exposed to be permeable regions.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical encoder comprising:
   a mobile unit in which light-transmitting parts and light-shielding parts are alternately arrayed so as to be equal in width and equal in interval to one another, the light-transmitting parts being implemented by light-permeable parts or light-reflecting parts;
   a light-emitting part for emitting light toward the mobile unit;
   light-receiving parts for receiving light emitted from the light-emitting part via the light-transmitting parts of the mobile unit; and
   a move-information-signal generating part for, based on change quantities of the light which varies in response to motions of the mobile unit and which is received by the light-receiving parts, generating and outputting a plurality of move information signals which represent move information on the mobile unit and which are independent of one another,
   wherein the light-receiving parts are positioned in correspondence to a specified number of the light-transmitting parts and composed of a plurality of photodiodes provided to a number represented by a product of a number of move information signals and the number of the corresponding light-transmitting parts raised to a power, wherein the power is an integer greater than one,
   wherein the plurality of photodiodes constituting the light-receiving parts are arrayed such that an equal number of photodiodes are respectively assigned to regions each of which is composed of a light-transmitting part in the specified number of corresponding light-transmitting parts and a light-shielding part rearwardly neighboring the light-transmitting part in a moving direction of the mobile unit,
   wherein assuming that an interval of the light-transmitting parts in the mobile unit is 1 pitch,
   with respect to mutually neighboring two photodiode groups each of which is composed of a plurality of photodiodes and are allocated to each of the regions, an interval between a photodiode of one photodiode group closest to the other photodiode group and a photodiode of the other photodiode group closest to the one photodiode group, and an interval between mutually neighboring two photodiodes belonging to an identical photodiode group, are each a value resulting from dividing the pitch by a product of the number of the move information signals independent of one another and the number of the corresponding light-transmitting part raised to a power, wherein the power is an integer greater than one.

2. The optical encoder as claimed in claim 1, wherein
   the number of the move information signals is four,
   the number of the light-transmitting parts corresponding to the light-receiving parts is three,
   the power is a square,
   the width of each photodiode is $(1/18)\times$pitch,
   with respect to the mutually neighboring two photodiode groups, an interval between a photodiode of one photodiode group closest to the other photodiode group and a photodiode of the other photodiode group closest to the one photodiode group is $(1/12)\times$pitch, and
   an interval between the mutually neighboring two photodiodes belonging to an identical photodiode group is $(1/36)\times$pitch.

3. The optical encoder as claimed in claim 1, wherein
   the number of the move information signals is four,
   the number of the light-transmitting parts corresponding to the light-receiving parts is three,
   the power is a cube,
   the width of photodiode is $(1/54)\times$pitch,
   with respect to the mutually neighboring two photodiode groups, an interval between a photodiode of one photodiode group closest to the other photodiode group and a photodiode of the other photodiode group closest to the one photodiode group is $(1/36)\times$pitch, and
   an interval between the mutually neighboring two photodiodes belonging to an identical photodiode group is $(1/108)\times$pitch.

4. An optical encoder comprising:
   a mobile unit in which light-transmitting parts and light-shielding parts are alternately arrayed so as to be equal in width and equal in interval to one another, the light-transmitting parts being implemented by light-permeable parts or light-reflecting parts;
   a light-emitting part for emitting light toward the mobile;
   light-receiving parts for receiving light emitted from the light-emitting part via the light-transmitting parts of the mobile unit; and
   a move-information-signal generating part for, based on change quantities of the light which varies in response to motions of the mobile unit and which is received by the light-receiving parts, generating and outputting a plurality of move information signals which represent move information on the mobile unit and which are independent of one another,
   wherein the light-receiving parts are positioned in correspondence to a specified number of the light-transmitting parts and composed of a plurality of photodiodes provided to a number represented by a product of a number of move information signals and the number of the corresponding light-transmitting parts raised to a power, wherein the power is an integer greater than one,
   wherein the plurality of photodiodes constituting the light-receiving parts are arrayed such that an equal number of photodiodes are respectively assigned to regions each of which is composed of a light-transmitting part in the specified number of corresponding light-transmitting parts and a light-shielding part rearwardly neighboring the light-transmitting part in a moving direction of the mobile unit,
   wherein assuming that a interval of the light-transmitting parts in the mobile unit is 1 pitch and that a direction toward which the mobile unit advances is a forward side, and assuming that with respect to a plurality of photodiodes belonging to photodiode groups each of which is composed of a plurality of photodiodes and are allocated to each of the regions, photodiodes positioned at odd-numbered places as counted from a forward top are first photodiodes while photodiodes positioned at even-numbered places are second photodiodes, and further that out of the first photodiodes, photodiodes arrayed at forward-side ($\frac{1}{2}$)×pitch are first A photodiodes while photodiodes arrayed at rearward-side ($\frac{1}{2}$)×pitch, opposite to the forward side, are assigned as first B photodiodes, and moreover out of the second photodiodes, photodiodes arrayed at foremost-side ($\frac{1}{4}$)×pitch and rearmost-side ($\frac{1}{4}$)×pitch are second A photodiodes while photodiodes arrayed at a middle ($\frac{1}{2}$)×pitch between foremost-side ($\frac{1}{4}$)×pitch and rearmost-side ($\frac{1}{4}$)×pitch are second B photodiodes, then the move-information-signal generating part generates and outputs four move information signals independent of one another and representing move information on the mobile unit based on signals representing change quantities of received light quantity derived from four types of photodiodes, the first A photodiodes, the first B photodiodes, the second A photodiodes and the second B photodiodes.

5. Electronic equipment which includes the optical encoder as defined in any of claims 1, 2, 3, or 4.

* * * * *